May 13, 1924. 1,493,757
H. E. LA BOUR
METHOD OF TREATING LIQUIDS
Filed Oct. 6, 1919
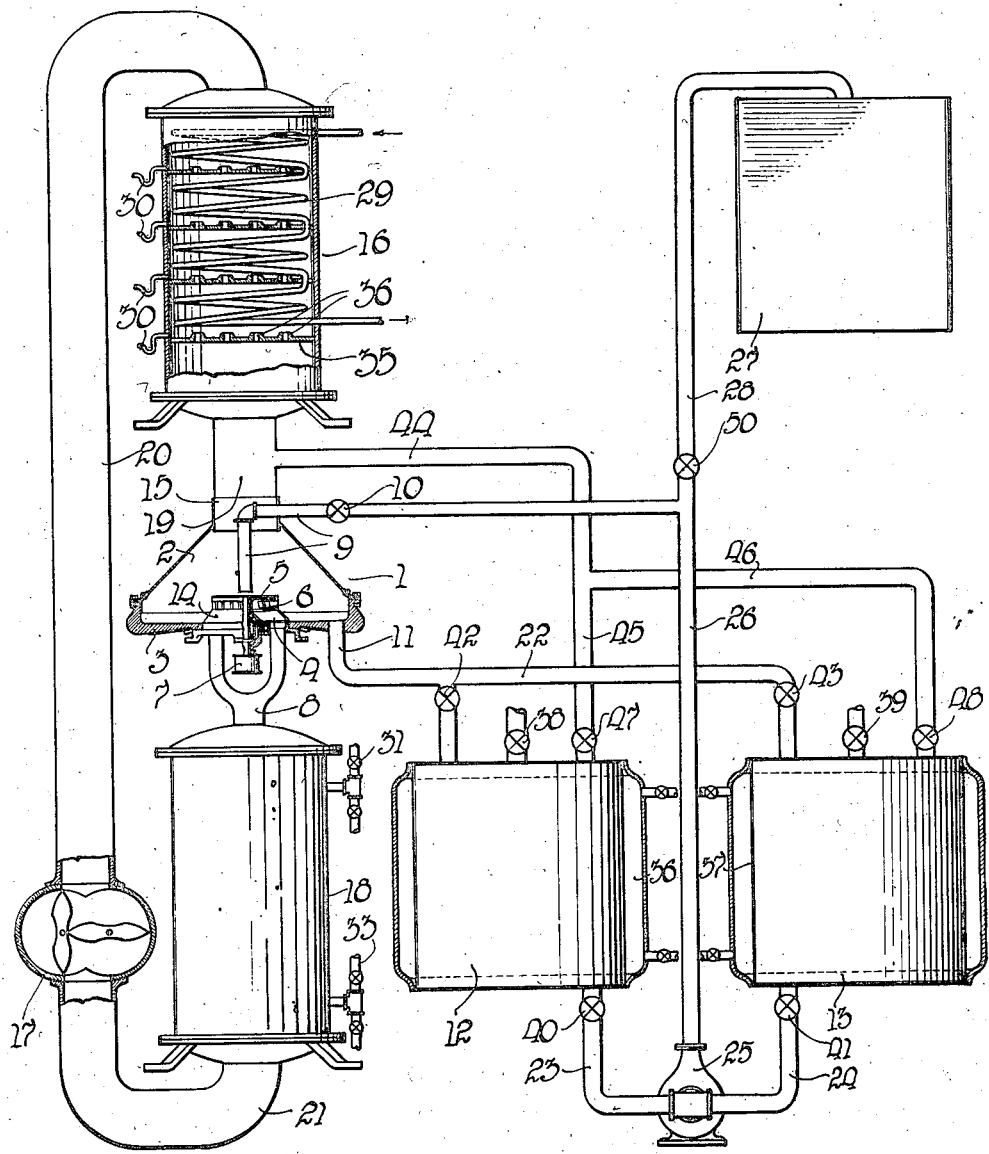
Inventor
Harry E. La Bour
By [signature]
Attorneys.

Patented May 13, 1924.

1,493,757

UNITED STATES PATENT OFFICE.

HARRY E. LA BOUR, OF CHICAGO, ILLINOIS, ASSIGNOR TO CHEMICAL EQUIPMENT COMPANY, OF CHICAGO, ILLINOIS, A CORPORATION OF ILLINOIS.

METHOD OF TREATING LIQUIDS.

Application filed October 6, 1919. Serial No. 328,821.

*To all whom it may concern:*

Be it known that I, HARRY E. LA BOUR, a citizen of the United States, residing at Chicago, in the county of Cook and State of Illinois, have invented a certain new and useful Improvement in Methods of Treating Liquids, of which the following is a full, clear, concise, and exact description, reference being had to the accompanying drawings, forming a part of this specification.

The present invention relates to a method of and means for treating liquids and is particularly adapted to the purpose of dealcoholizing and treating beer.

While the particular method and means which I shall describe is adapted to the dealcoholization and treatment of beer, it is to be understood that the invention is not limited to that particular use or purpose, and that the principles and means which I shall hereinafter describe are adapted to other purposes and other liquids, and I intend that the scope of the invention be limited not by the name which is given the means and apparatus, nor by the particular liquid which is operated upon, but rather by the novel steps and combinations of means set out in the appended claims.

The present invention is an improvement upon prior methods set out in my copending applications, Serial Nos. 320,372 and 314,634.

As explained in my previous application above referred to, it is necessary in the treatment of beer that the liquid be kept entirely out of contact with the atmosphere for two chief reasons. First of all it is essential that the beer be treated in a closed space to avoid the danger of inoculation or infection with harmful bacteria. It is also necessary that the beer be treated in a closed space or system in order to prevent the escape of the aroma or flavor which gives the beer its character.

I have discovered further that in methods of dealcoholization as heretofore practiced, the beer is discharged from the treating system in a warm or fairly warm condition. This is the worst possible condition in which the beer could be discharged, because it is at such time subject to inoculation or infection, and its condition is such that it will tend to lose its aroma or flavor much more easily than if it were cold, and furthermore, it is as low as possible in carbon dioxide content.

According to my invention, I treat the beer to dealcoholize the same in contact with a body of neutral gas in a closed system, and after the dealcoholization has been carried to the desired extent or approximately the desired extent, I change the character of the system from a dealcoholization system to a cooling and charging system in which I cool the beer and charge it with the desired constituents so that it is substantially ready for bottling or storage.

In order to acquaint those skilled in the art with the preferred manner of embodying and practicing my invention, I shall now describe one specific method and embodiment of the invention in connection with the accompanying drawings, which form a part of this specification.

The single figure of the drawings illustrates diagrammatically a system for treating beer in accordance with my invention.

Primarily I employ a closed gas circuit and a closed liquid circuit, both of which circuits have one point in common where the gas and the liquid are brought into intimate contact. This point is defined by the spray device 1. This spray device is described and claimed in my Patent No. 1,318,774, October 14, 1919.

It comprises in general a casing provided with a downwardly sloping wall 2 at the upper part of the casing and a container or trap for liquid 3 in the bottom portion thereof with a gas chamber 4 at the central portion of the casing and communicating with a rotating disc 5, which disc has impeller vanes 6 on the lower surface thereof in communication with the gas chamber 4, so that the gas in the chamber 4 is thrown outwardly by the impeller 6 when the disc 5 is rotated. A driving element 7, such as a pulley or other connection to a motor is provided for driving the disc 5. Gas enters the gas chamber 4 by means of the divided pipe 8 and as above mentioned is thrown outwardly by the impeller vanes in a substantially horizontal direction, radially from the lower surface of the disc 5.

The liquid to be treated is discharged upon the top of the disc 5 by means of the pipe 9 which is controlled by the valve 10. The liquid is drained off from the bottom of the chamber by means of the pipe 11 to one of the receiving tanks 12 or 13, as will be described later. The gas chamber 4 has a wall 14 which separates the liquid trap from said gas chamber, which wall closely fits the lower edges of the vanes 6 whereby the vanes 6 on the rotating disc form a gas pump for discharging the gas radially in an expanding sheet or curtain, all as described in my above mentioned copending application. The upper part of the conical wall 2 is provided with a depending flange 15, which arrests the upward travel of any disentrained liquid which has been thrown against the side wall. The gas has a whirling motion, and in throwing the liquid out against the conical walls 2, tends to throw the same down into the pocket which is formed below the impeller disc 6. This much of the construction is described and claimed in my prior application.

The gas and liquid contact device which I have just described is the common point for both the gas system and the liquid system. The gas system comprises further the condenser 16, the pump 17 and the heat-exchange device 18. These parts are all connected together by suitable piping such as 19, 20, and 21, to maintain a closed circuit or circulatory system for the gas, which gas is preferably carbon dioxide. Other gas might be employed, but I find that carbon dioxide is plentiful around breweries and is furthermore the gas with which beverages are generally charged, and therefore entirely suitable for the present use.

The liquid system comprises the pipe 9, which discharges the liquid upon the rotating disc 5, the pipe 11 which drains the liquid off from the trap or lower portion of the casing, the pipe 22, leading to the tanks or vats 12 and 13, the pipes 23 and 24 leading to the pump 25, which discharges the liquid through the pipe 26, either to the contact device 1 or to the vat or tank 27 when the operation is completed.

The gas in the gaseous system is circulated by means of the displacement pump 17, and is driven to the heat exchange device 18, where the gas is heated to a suitable temperature, preferably in the neighborhood of 280° F. and is then discharged to the gas chamber 4, where it is driven by the impeller vanes 6 into intimate contact with the liquid discharged from the disc 5. At this point the carbon dioxide and the beer are brought into intimate contact whereby the alcohol in the beer is vaporized and carried upward with the gas, the beer being discharged downwardly into the lower part of the casing and draining out by way of the pipe 11. The gas then passes up through the pipe 19 into the condenser 16, where the gas and vapor are cooled simultaneously. It will be noted that the condenser 16 is provided with a cooling coil 29 in which the flow of cooling brine or other cooling medium is in a direction generally counter to the flow of the gas and vapor. The vapor and gas enter at the bottom of the condenser 16, while the cooling medium enters at the top of the coil 29. I have divided the condenser 16 into a number of separate compartments by means of the trays or plates 35, these plates having openings 32 to permit the gas and vapor to pass therethrough, the openings, however, being protected by rims or flanges so that the liquid which is condensed and dropped upon the corresponding plate 35 will not pass down through the openings 32, but will instead run off through the trap 30, which drains the corresponding chamber. On account of the counter current of the gas and vapor as compared with the cooling medium, the tendency is for the upper part of the condenser to be at a lower temperature than the lower part. The result is that the gas is dried in stages and dephlegmation of the condenser vapor takes place, the less volatile liquids condensing at the bottom, and the more volatile coming out as the temperature is lowered. The effect of the cooling coil 29 is to create a drop in pressure within the condenser 16 both because of the contraction of the gas and because of the condensing of the vapor which is carried thereby. The gas is then withdrawn from the condenser 16 by way of the pipe 20, by means of the pump 17 which discharges the gas into the heat exchange device 18. The heat exchange device is provided with suitable heat-transferring means on the inside thereof connected with a source of supply for a heating medium, as by means of the valves 31 and 33.

The liquid system comprises the two receiving tanks 12 and 13, these tanks being provided with heating means, which I have shown in the present instance, as being the hot water jackets 36 and 37. Thus one of the tanks 12 or 13 may be operating as the receiving tank in the liquid circulating system, while the other tank is being filled with beer and being warmed by means of the heating jacket. These tanks 12 and 13 are provided with connections 38 and 39 for filling the tanks and are provided with suitable valves 40 and 41 for controlling the connection of the tanks with the pump 25, and with suitable valves 42 and 43 for controlling the draining of the liquid back into the same from the spray device 1. Assuming that the tank 12 is in communication with the pump 25 and that the liquid therefrom is being circulated through the liquid and gas contact device 1, the beer will be discharged upon the rotating disc 5, where it is sprayed out radially in contact with the gas. The heated gas supplies the heat of vaporization for the alcohol. The liquid is thrown down into the bottom of the casing and drains off by way of the pipe 11 back through the valve 42, into tank 12, this circulation being maintained until the alcohol has been removed to a sufficient degree. As the beer drains back into the tank 12, it naturally entrains a very considerable content of carbon dioxide gas in the contact device 1. I have provided a special connection from the tanks 12 and 13 to the pipe 19 and thence to the condenser 16 for taking back into the gaseous system such gas as has been entrained in the liquid system. A pipe 44 is connected to the gas pipe 19 and this pipe is branched off at 45 and 46 to lead to the tanks 12 and 13 respectively. The branch pipes 45 and 46 are provided with valves 47 and 48 for controlling the proper connection. Thus, while the liquid is being circulated through the liquid and gas contact device 1, the gas which is entrained and carried off into the tank 12 is given off in said tank, which presents a fairly large releasing surface for the gas. Due to the reduced pressure obtaining in the pipe 19 and the condenser 16, this gas is easily carried off by way of the pipe 44 back into the gas system.

After the proper degree of dealcoholization has been secured, I shut off the means for heating the gas as it enters the gas chamber 4, in this case by closing the valves 31 and 33, and continue circulating the gas and the liquid in contact with each other. The result is that cold dry gas quickly cools the liquid. I prefer to accelerate this cooling action by introducing a cooling medium into the jacket 36 or 37, but this is not absolutely essential, as the cooling effect of the cooling coil 29 in the condenser 16 may be relied upon. The gas is cooled and it in turn cools the liquid, and as the two are circulated in contact with each other the tendency of the liquid to absorb gas and retain the same in an absorbed condition is very greatly increased. This is further augmented by the equalization of gas pressure which begins to occur when less condensation in the condenser 16 takes place. That is to say, while the gas is being circulated in the cold state through the contact device 1 in contact with the liquid, there is less suction upon the pipe 44, and consequently that gas which is absorbed in the liquid has a lower vapor pressure and tends to remain absorbed. When this state has proceeded to the required condition, the valve 50 is opened and the valve 10 is closed, whereupon the liquid from the tank 12 is discharged into the receiving tank or vat 27, which is preferably a closed receptacle. Thereafter the tank 12 is filled with fresh beer to be treated and the tank 13 is employed in the circulating system.

It will be seen from the above description of operation that when the beer is finally delivered into the tank or vat 27, it is in proper condition for storage or transportation in that it is properly charged with carbon dioxide and is in a cold or refrigerated condition.

I do not intend to be limited to the details of operation or the precise steps above described.

I claim:

1. In a method of first dealcoholizing and then charging of beer by bringing the beer in contact with a gas, the following steps, namely, bringing the gas in a relatively warm condition and the liquid into intimate contact to carry out the alcohol, then cooling the gas to remove the alcohol and then bringing the gas in a relatively cool condition into intimate contact with the liquid to cool the liquid and to charge the same with gas.

2. In a method of treating beer, the following steps, bringing a gas in relatively warm condition into intimate contact with the beer to carry off the alcohol thereof as a vapor, then cooling the gas and the vapor to separate out the alcohol and bringing the gas thus cooled into intimate contact with the beer to cool the beer and to charge the beer with gas.

3. In combination, a closed gas circulatory system, a closed liquid circulatory system, a contact device common to both systems, means for heating the gas before it is brought into contact with the liquid, means for condensing out the vapor carried off by the gas, and means for injecting the gas in a cold condition in contact with the liquid after a predetermined amount of vapor has been condensed therefrom.

4. In a system for first dealcoholizing and then charging beer having a closed circulatory system for gas and a closed circulatory system for liquid, the method of operation which comprises heating the gas and then bringing the heated gas and the liquid into intimate contact to produce vaporization of a certain constituent of the liquid, separating said constituent by cooling and bringing the cold gas and the liquid again into intimate contact to cool the liquid and discharge it with the gas.

5. In the method of separating out constituents of a liquid by the means of a carrying gas, the following steps, namely, bringing the relatively warm gas and the liquid into intimate contact to carry off certain constituents, separating out certain of the constituents carried off by the gas, and then cooling the gas and bringing the relatively cooled gas and the constituents still contained thereby, into intimate contact with the liquid to charge the same with the gas and with the constituents still contained therein.

6. A method of treating a liquid comprising the following steps, circulating a liquid and a body of gas in closed circuits, bringing the gas at a relatively high temperature into intimate contact with the liquid at one point in the circuits, treating the gas at another point in the gas circuit to separate out constituents of the liquid carried out by the gas, and finally lowering the temperature of the gas where it is brought into contact with the liquid to charge the liquid with gas.

7. The method of treating beer to first dealcoholize and then charge the same which includes the steps first of bringing carbon dioxide gas in a warm condition into contact with the beer to remove the alcohol, then of separating the alcohol from the gas, and then of returning the gas in a cool condition into contact with the dealcoholized beer to charge the same, thereby returning to the beer certain desirable constituents which were removed therefrom with the alcohol but where not removed from the gas with the alcohol.

In witness whereof, I hereunto subscribe my name this 3rd day of October, A. D. 1919.

HARRY E. LA BOUR.